(12) United States Patent
Alvi et al.

(10) Patent No.: US 12,494,665 B2
(45) Date of Patent: Dec. 9, 2025

(54) POWER INVERTER WITH TWISTED AND SEGMENTED WIRE CONDUCTORS FOR CURRENT CONDUCTION AND SENSING

(71) Applicant: GM GLOBAL TECHNOLOGY OPERATIONS LLC, Detroit, MI (US)

(72) Inventors: Muhammad Hussain Alvi, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 941 days.

(21) Appl. No.: 17/694,152

(22) Filed: Mar. 14, 2022

(65) Prior Publication Data

US 2023/0291225 A1    Sep. 14, 2023

(51) Int. Cl.
*H02J 7/02* (2016.01)
*B60L 53/18* (2019.01)
*B60L 53/30* (2019.01)

(52) U.S. Cl.
CPC ............... *H02J 7/02* (2013.01); *B60L 53/18* (2019.02); *B60L 53/305* (2019.02)

(58) Field of Classification Search
CPC .. H02K 3/24; H02K 3/12; H02K 3/28; H02K 3/522; H02K 1/20; H02K 1/14; H02K 1/16; H02K 21/14; H02K 21/22; H02J 7/02
See application file for complete search history.

(56) References Cited

U.S. PATENT DOCUMENTS

2020/0328640 A1* 10/2020 Takahashi ................ H02K 1/14
2021/0384804 A1* 12/2021 Ishizaki ................. H02K 11/30

OTHER PUBLICATIONS

U.S. Appl. No. 17/153,455, filed Jan. 20, 2021, Alvi et al.

\* cited by examiner

*Primary Examiner* — Bryan R Perez (57) ABSTRACT

A power inverter includes first and second inputs and a plurality of power switches in communication with the first and second inputs. First, second and third outputs communicate with the plurality of power switches. First, second and third conductors are configured to connect the first, second and third outputs to an electric machine. Each of the first, second and third conductors comprise a plurality of twisted and segmented wires.

20 Claims, 5 Drawing Sheets

POWER INVERTER WITH TWISTED AND SEGMENTED WIRE CONDUCTORS FOR CURRENT CONDUCTION AND SENSING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to inverters and more particularly to power inverters for electric vehicles.

Electric vehicles (EVs) such as battery electric vehicles (BEVs), hybrid vehicles, and/or fuel cell vehicles include one or more electric machines and a battery system including one or more battery cells, modules and/or packs. A power control system is used to control charging and/or discharging of the battery system during charging and/or driving.

The power control system includes a power inverter that is arranged between the battery system and the electric machine. The power inverter includes solid copper busbars that connect the power inverter to the battery system and from the power inverter to the electric machine. The power inverter has a significant volume and weight due to the copper busbars.

At lower frequencies, the cross-section of the copper busbar conducts current in a uniform manner. As frequency increases, the cross-section of the copper busbar does not conduct current uniformly. At higher frequencies, current density increasingly accumulates in corners of the busbar due to Faraday induction effects (skin and proximity effects) leading to higher resistance.

The variation in current density with frequency also adversely affects sensing of phase currents using magnetic field based methods. Sensors are arranged in fixed locations adjacent to the copper busbars to sense magnetic fields produced by phase currents flowing through the copper busbars. Since the location of the current conducted by the copper busbars varies with frequency, it becomes more complex to determine the phase currents from the sensed magnetic fields.

SUMMARY

A power inverter includes first and second inputs and a plurality of power switches in communication with the first and second inputs. First, second and third outputs communicate with the plurality of power switches. First, second and third conductors are configured to connect the first, second and third outputs to an electric machine. Each of the first, second and third conductors comprise a plurality of twisted and segmented wires.

In other features, the plurality of power switches each include first terminals, second terminals and control terminals. The first terminals of first ones of the plurality of power switches are connected to the first input. Second terminals of second ones of the plurality of power switches are connected to the second input. The first, second and third outputs are connected between the second terminals of the first ones of the plurality of power switches and the first terminals of the second ones of the plurality of power switches.

In other features, the first, second and third conductors include first, second and third housings enclosing the plurality of twisted and segmented wires. A magnetic field sensor is arranged adjacent to the second housing of the second conductor. The magnetic field sensor is selected from a group consisting of an anisotropic magneto-resistive (AMR) sensor, a giant magneto-resistive (GMR) sensors, a tunnel magneto-resistive (TMR) sensors, and a Hall effect sensor.

In other features, the first, second and third conductors include first, second and third housings enclosing the plurality of twisted and segmented wires. At least two of the first, second and third housings extend in at least three planes.

In other features, the first housing includes a first portion, a second portion and a third portion. The first portion extends in a first plane. The second portion extends from the first portion in a direction transverse to the first plane. The third portion extends from the second portion in a second plane that is parallel to the first plane.

In other features, the second housing has rectangular shape and extends in the first plane spaced from the first portion of the first housing.

In other features, the third housing includes a first portion, a second portion, and a third portion, the first portion of the third housing extends in the first plane, the second portion of the third housing extends from the first portion in a direction transverse to the first plane, and the third portion extends from the second portion in a second plane that is transverse to the first plane.

In other features, each of the plurality of twisted and segmented wires comprise a first insulating sleeve and a plurality of multi-wire conductors arranged in the first insulating sleeve. The plurality of multi-wire conductors are wound around each other. Each of the multi-wire conductors includes multiple wires that are wound around each other inside a second insulating sleeve.

A power inverter includes first and second inputs and a plurality of power switches in communication with the first and second inputs. First, second and third outputs communicate with the plurality of power switches. First, second and third conductors are configured to connect the first, second and third outputs to an electric machine. Each of the first, second and third conductors comprise a plurality of twisted and segmented wires. Each of the plurality of twisted and segmented wires comprise a first insulating sleeve and a plurality of multi-wire conductors arranged in the first insulating sleeve. The plurality of multi-wire conductors are wound around each other. Each of the multi-wire conductors includes multiple wires that are wound around each other inside a second insulating sleeve. The first, second and third conductors include first, second and third housings enclosing the plurality of twisted and segmented wires. At least two of the first, second and third housings extend in at least three planes.

In other features, the plurality of power switches each include first terminals, second terminals and control terminals, the first terminals of first ones of the plurality of power switches are connected to the first input, second terminals of second ones of the plurality of power switches are connected to the second input, and the first, second and third outputs are connected between the second terminals of the first ones of the plurality of power switches and the first terminals of the second ones of the plurality of power switches.

In other features, the first, second and third conductors include first, second and third housings enclosing the plurality of twisted and segmented wires. A magnetic field sensor is arranged adjacent to the second housing of the second conductor. The magnetic field sensor is selected from a group consisting of an anisotropic magneto-resistive (AMR) sensor, a giant magneto-resistive (GMR) sensors, a tunnel magneto-resistive (TMR) sensors, and a Hall effect sensor.

In other features, the first housing includes a first portion, a second portion and a third portion, the first portion extends in a first plane, the second portion extends from the first portion in a direction transverse to the first plane, and the third portion extends from the second portion in a second plane that is parallel to the first plane.

In other features, the second housing has rectangular shape and extends in the first plane spaced from the first portion of the first housing.

In other features, the third housing includes a first portion, a second portion, and a third portion and the first portion of the third housing extends in the first plane. The second portion of the third housing extends from the first portion in a direction transverse to the first plane. The third portion extends from the second portion in a second plane that is transverse to the first plane.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A power inverter according to the present disclosure replaces copper busbars with segmented and twisted wire conductors to connect outputs of the power inverter to phases of an electric machine. The magnetic fields measured in response to the phase currents that are conducted by copper busbars vary with frequency due to Faraday induction effects (skin and proximity effects), it is difficult to accurately determine the phase currents from the sensed fields at both low and high frequencies. By replacing the copper busbars with the segmented and twisted wire conductors, the variation in the measured magnetic fields due to Faraday induction effects (skin and proximity effects) is reduced, which makes sensing the phase currents easier and more accurate at both low and high frequencies.

Figure 1:
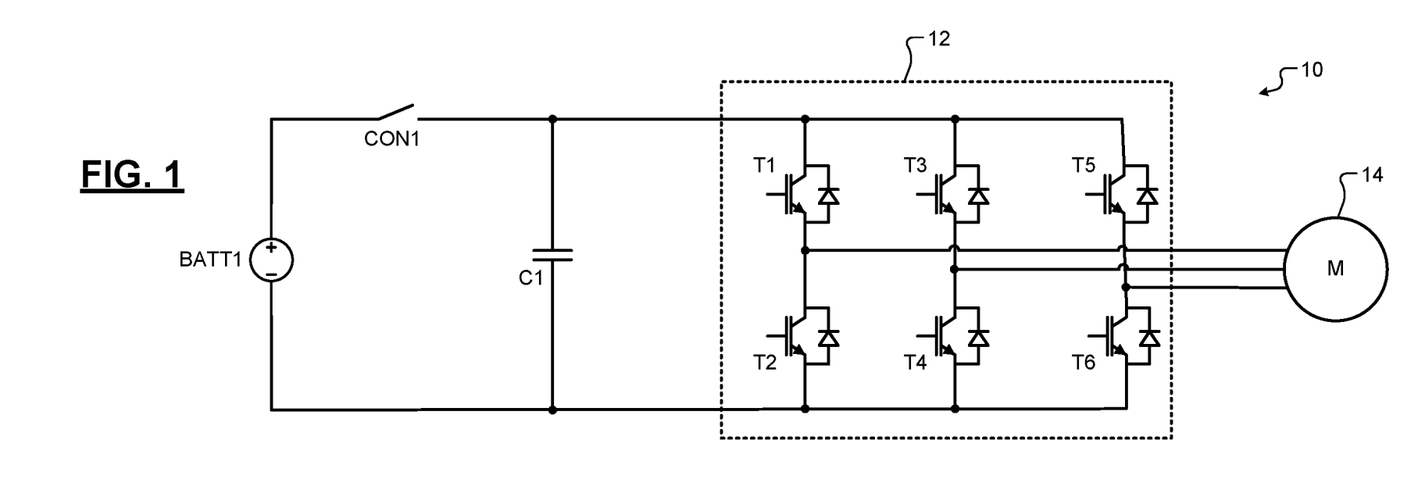
FIG. 1 is a functional block diagram of an example of a power control system including a power inverter according to the present disclosure.
Figure 2:
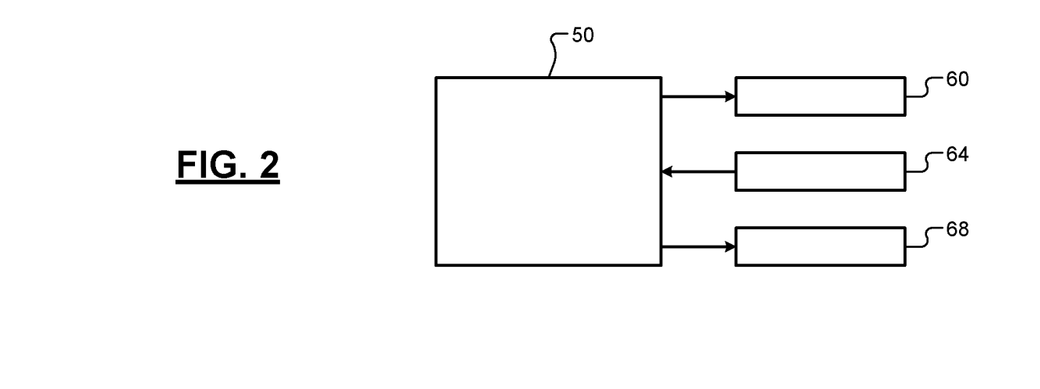
FIG. 2 is a functional block diagram of an example of a controller configured to control the power control system according to the present disclosure.

Referring now to FIGS. 1 and 2, a power control system 10 for a battery system (BATT1) includes a power inverter 12. The battery system BATT1 may include one or more battery cells, battery modules, and/or battery packs connected in series, parallel and/or combinations thereof. A contactor CON1 includes a first terminal connected to a first terminal of the battery system BATT1 and a second terminal connected to a capacitor C1 connected in parallel across inputs of the power inverter 12. The contactor CON1 selectively connects a first terminal of the battery system BATT1 to the capacitor C1 and the power inverter 12. While a single contactor CON1 is shown, two or more contactors can be used when more complex battery systems and/or switching are desired.

The power inverter 12 includes a plurality of power switches T1, T2, T3, T4, T5 and T6. First terminals of the power switches T1, T3 and T5 are connected to the second terminal of the contactor CON1. Second terminals of the power switches T1, T3 and T5 are connected to first terminals of the power switches T2, T4 and T6 and first, second and third phases of an electric machine 14. Second terminals of the power switches T2, T4 and T6 are connected to a second terminal of the battery system BATT1. While a specific configuration of switches are shown for the power inverter 12, other configurations can be used.

In FIG. 2, control terminals of the power switches T1, T2, T3, T4, T5 and T6 (collectively power switches 60) are connected to a controller 50. The controller 50 is connected to the power switches 60, sensors 64 and contactors 68. The sensors 64 can include temperature sensors, current sensors, voltage sensors and/or other types of sensors. In some examples, the controller 50 also receives one or more voltage command signals based on demand. The controller 50 is configured to control states of the power switches T1, T2, T3, T4, T5 and T6 to transfer power from the battery system BATT1 to the electric machine 14 during operation as a motor (for propulsion) or from the electric machine 14 to the battery system BATT1 during operation as a generator (for regeneration).

Figure 3:
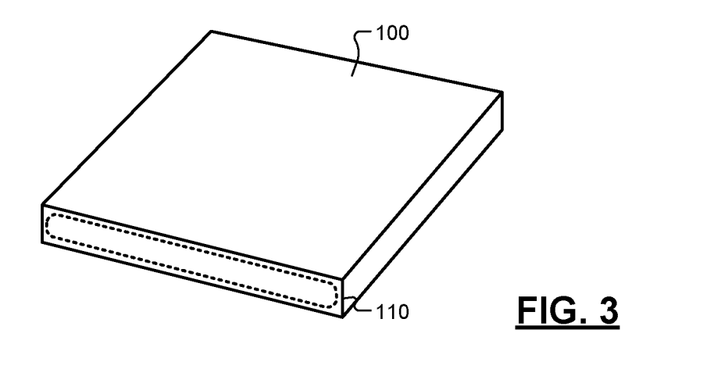
FIG. 3 is a perspective view of an example of a copper busbar according to the prior art.

Referring now to FIG. 3, a perspective view of a copper busbar 100 is shown. While the cross-section of the copper busbar 100 conducts current relatively uniformly at lower frequencies, it does not conduct current uniformly at higher frequencies. Current density accumulates in corners of the copper busbar 100 (as shown at 110) due to Faraday induction effects (skin and proximity effects), which leads to higher resistance. Since the phase currents that are conducted by the copper busbars vary with frequency, it becomes more complex to determine the phase currents from the sensed magnetic fields.

Figure 4:
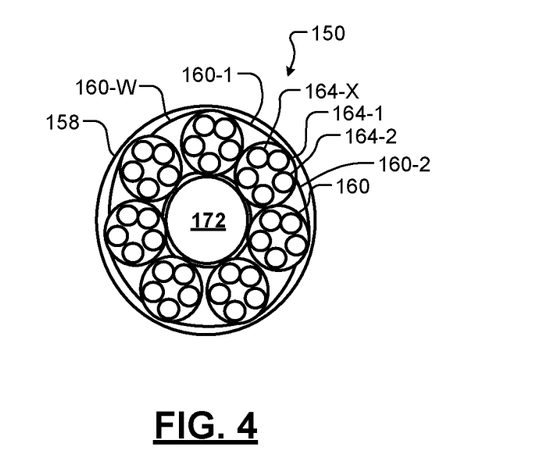
FIG. 4 is a cross-sectional view of an example of twisted and segmented wires according to the present disclosure.

Referring now to FIG. 4, rather than connecting the power inverter 12 to the electric machine 14 using copper busbars, the power inverter 12 according to the present disclosure is connected to the electric machine 14 using a plurality of twisted and segmented wire conductors 150. The twisted and segmented wire conductors 150 include an outer insulating sleeve 158. A plurality of multi-wire conductors 160-1, 160-1, 160-2, . . . , and 160-X (collectively multi-wire conductors 160) are arranged within the outer insulating sleeve 158. In some examples, the multi-wire conductors 160 are wound around a core 172. In other examples, the multi-wire conductors 160 are wound around each other without the core 172.

Each of the multi-wire conductors 160 includes a plurality of wires 164-1, 164-2, . . . , and 164-X that are twisted around each other inside a second insulating sleeve 166. In some examples, the wires 164-1, 164-2, . . . , and 164-X are also wound around a core (not shown). The twisted and segmented wire conductors 150 have significantly lower variation in current density due to reduced skin effect and hence lesser change in the magnetic fields with changes in frequency. As a result, determining the phase currents from the sensed magnetic fields is less complex.

Figure 5:
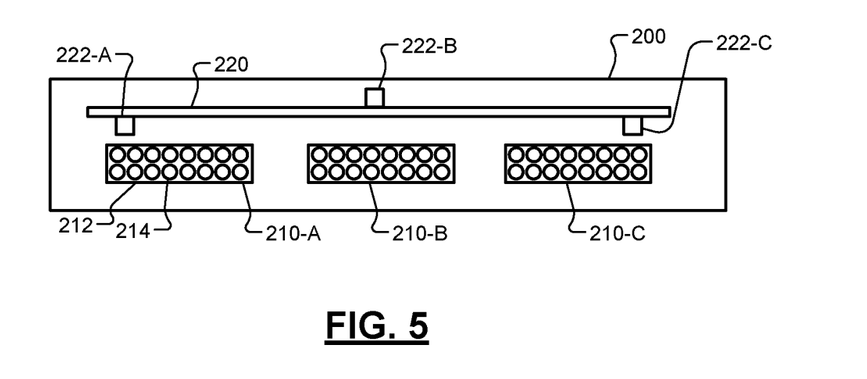
FIG. 5 is a side view of an example of a power inverter, power inverter conductors arranged in parallel and comprising twisted and segmented wires, and magnetic field sensors according to the present disclosure.

Referring now to FIG. 5, a power inverter 200 includes twisted and segmented wire conductors 210-A, 210-B and 210-C to connect first, second and third phases of the power inverter 200 to first, second and third phases A, B and C, respectively, of the electric machine 14. The twisted and segmented wire conductors 210-A, 210-B and 210-C include a housing 212 and a plurality of twisted and segmented wires 214 arranged therein. In the example in FIG. 5, the twisted and segmented wires 214 in each of the twisted and segmented wire conductors 210-A, 210-B and 210-C are arranged in two rows and multiple columns. The twisted and segmented wire conductors 210-A, 210-B and 210-C are connected to the power inverter 200 arranged side-by-side in a plane. More generally, the twisted and segmented wires 214 can be arranged in two or more rows and two or more columns or in other configurations such as round, square or other housing shapes.

Sensors 222-A, 222-B and 222-C are arranged adjacent to the conductors 210-A, 210-B and 210-C, respectively. In some examples, the sensors 222-A, 222-B and 222-C are arranged on a printed circuit board 220 or other substrate that is arranged in a plane parallel to a plane including the conductors 210-A, 210-B and 210-C. In some examples, spacing between the sensors 222-A, 222-B and 222-C is maximized to reduce cross coupling between fields from different phases.

Figure 6:
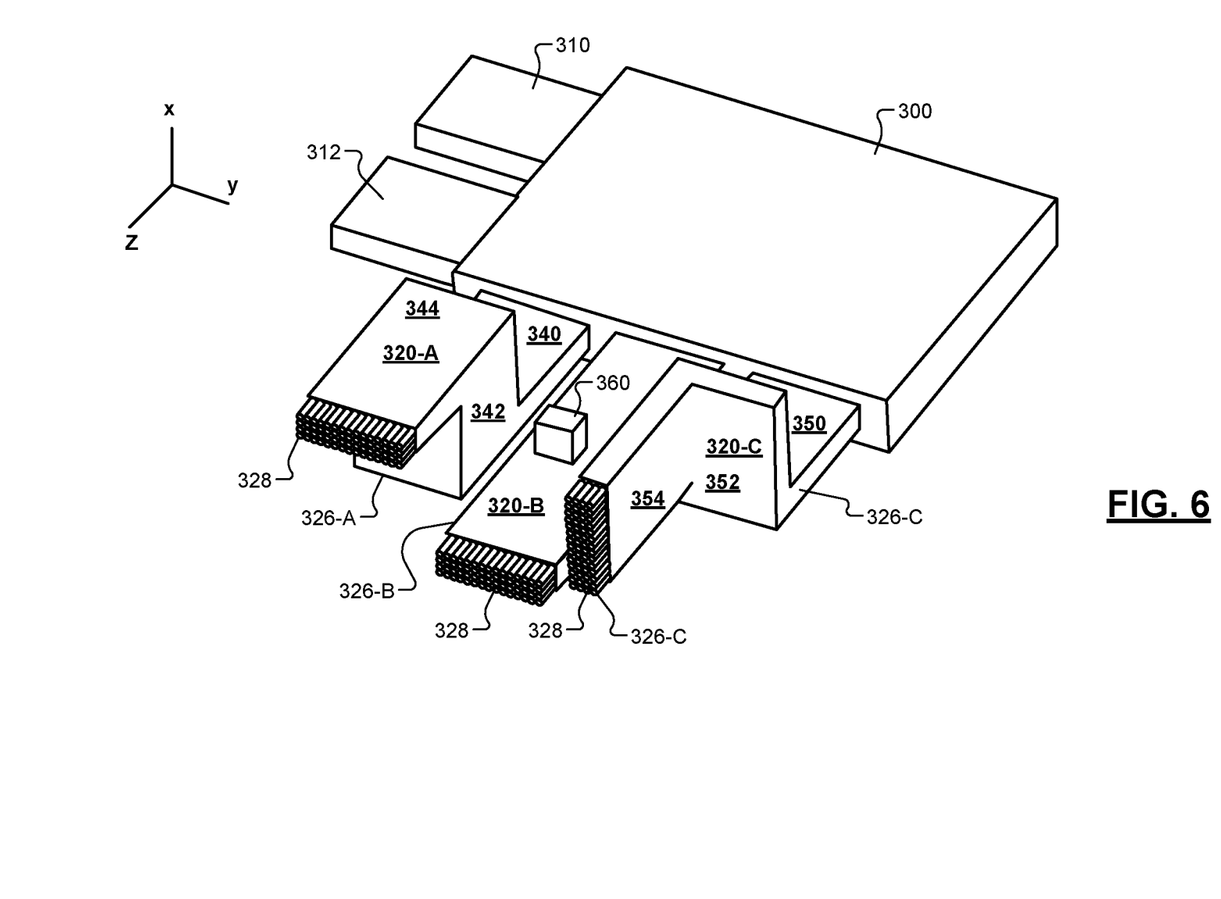
FIG. 6 is a perspective view of a power inverter, twisted and segmented wire conductors, and a magnetic field sensor according to the present disclosure.

Referring now to FIG. 6, a power inverter 300 includes twisted and segmented wire conductors 320-A, 320-B and 320-C connecting first, second and third phases of the power inverter 300 to first, second and third phases A, B and C, respectively, of the electric machine 14. Conductors 310 and 312 connecting the power inverter 300 to the battery system BATT1 can be copper busbars or other type of conductors.

The twisted and segmented wire conductors 320-A, 320-B and 320-C are arranged in housings 326-A, 326-B and 326-C and a plurality of twisted and segmented wires 328 arranged therein. In some examples, the housings 326-A, 326-B and 326-C are made of plastic or another material that does not affect magnetic fields.

The outer housing 326-A includes a first portion 340 located adjacent to the power inverter 300, a second portion 342 extending from the first portion 340 and a third portion 344 extending from the second portion 342. The first portion 340 extends from the power inverter 300 in a first plane. The second portion 342 extends from the first portion 340 in a direction transverse to the first plane. The third portion 344 extends from the second portion 342 in a second plane that is parallel to and spaced from the first plane. The outer housing 326-B extends in the first plane laterally spaced from the first portion of the outer housing 326-A. In some examples, the outer housing 326-B has a rectangular cross-sectional shape, although other shapes can be used.

In some examples, the outer housing 326-C includes a first portion 350, a second portion 352 and a third portion 354. The first portion 350 extends in the first plane. The second portion 352 extends from the first portion in a direction transverse to the first plane. The third portion 354 is rotated and extends from the second portion 352 in a second plane that is transverse to the first plane.

The arrangement of the twisted and segmented wire conductors 320-A, 320-B and 320-C in different planes is to create x, y, and z fields that correspond to a, b, and c currents, respectively. This approach enables measurement of the a, b, and c currents with higher accuracy.

In the example in FIG. 6, the twisted and segmented wires 328 in each of the twisted and segmented wire conductors 320-A, 320-B and 320-C are arranged in four rows and multiple columns. More generally, the twisted and segmented wires 214 can be arranged in two or more rows and two or more columns or in other configurations such as round, square or other housing shapes.

Due to the arrangement in FIG. 6, a single sensor can be used to sense the magnetic fields for the phases. A sensor 360 is arranged adjacent to the twisted and segmented wire conductors 320-B, respectively. In some examples, the sensor 360 comprises a point field detector (PFD) such as an anisotropic magneto-resistive (AMR) sensors, a giant magneto-resistive (GMR) sensors, a tunnel magneto-resistive (TMR) sensors, a Hall effect sensor, or other suitable sensors that can detect field in the three dimensions X, Y and Z direction.

Figure 7:
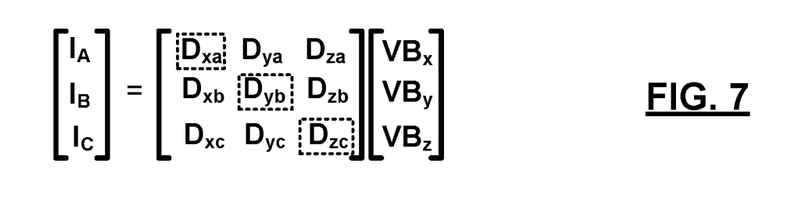
FIG. 7 is a matrix showing a relationship between current and voltage with dominant and frequency invariant terms for FIG. 6.
Figure 8:
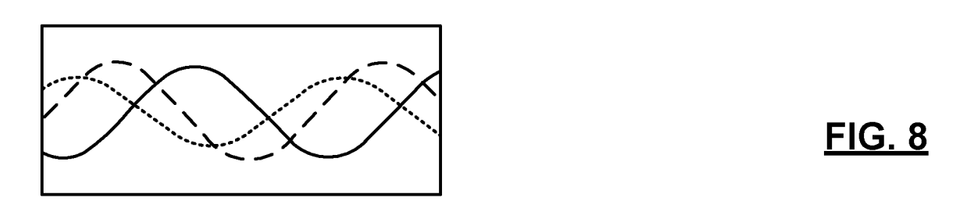
FIGS. 8 and 9 are graphs illustrating an example of voltage and current signals.
Figure 9:
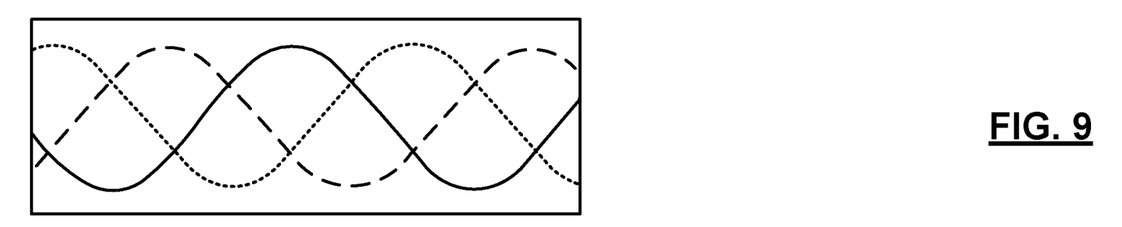

Referring now to FIGS. 7-9, a matrix can be used to calculate currents from the sensed fields. The matrix includes dominant and frequency invariant terms. In FIG. 7, the terms $D_{xa}$, $D_{yb}$ and $D_{zc}$ dominate and all terms of the matrix are relatively frequency invariant due to the orientation of the sensor 360 and segmented and twisted conductors. In FIG. 8, an example of sensed fields $V_{Bx}$, $V_{By}$, and $V_{Bz}$ are shown. In FIG. 9, the decoupled phase currents $I_A$, $I_B$ and $I_C$ are shown.

Figures 10, 11:
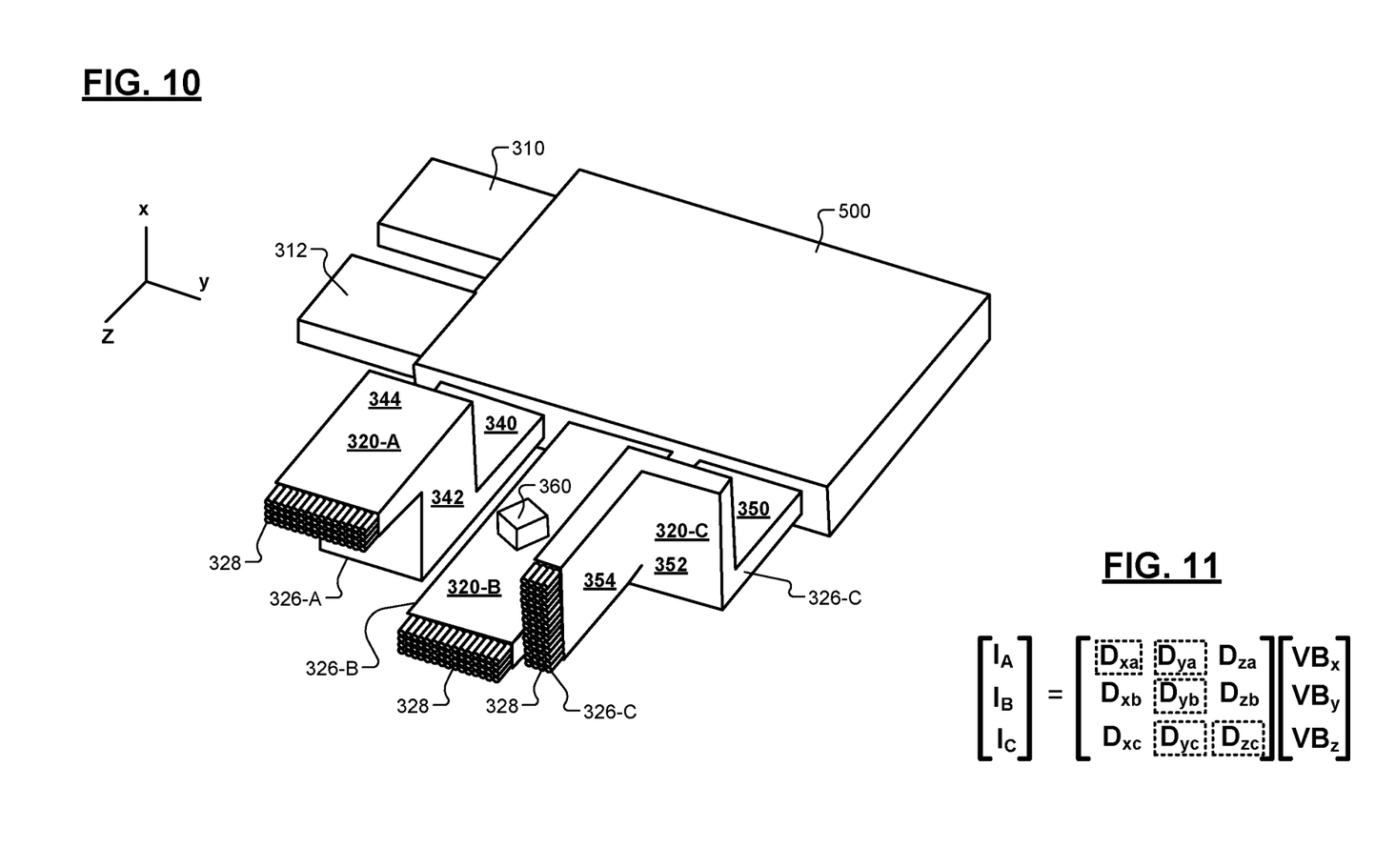
FIG. 10 is a perspective view of another example of a power inverter, twisted and segmented wire conductors, and a magnetic field sensor according to the present disclosure.
FIG. 11 is a matrix showing a relationship between current and voltage with dominant and frequency invariant terms for FIG. 10.

Referring now to FIGS. 10 and 11, a power inverter 500 is similar to the power inverter 300 is shown. In FIG. 10. the orientation of the sensor 360 is rotated relative to the first plane as shown in FIG. 10. In FIG. 11, the terms $D_{xa}$, $D_{ya}$, $D_{yb}$, $D_{yc}$, and $D_{zc}$ dominate and all terms of the matrix are relatively frequency invariant. This orientation of the sensors provides the field information in a different form allowing addition of redundant sensors.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power inverter comprising:
   first and second inputs;
   a plurality of power switches in communication with the first and second inputs;
   first, second and third outputs in communication with the plurality of power switches; and
   first, second and third conductors configured to connect the first, second and third outputs to an electric machine, wherein each of the first, second and third conductors comprise a plurality of twisted and segmented wires,
wherein the first, second and third conductors include first, second and third housings enclosing the plurality of twisted and segmented wires, wherein at least two of the first, second and third housings extend in at least three planes, and
wherein the first housing includes a first portion, a second portion and a third portion, the first portion extends in a first plane, the second portion extends from the first portion in a direction transverse to the first plane, and the third portion extends from the second portion in a second plane that is parallel to the first plane.

2. The power inverter of claim 1, wherein:
the plurality of power switches each include first terminals, second terminals and control terminals,
the first terminals of first ones of the plurality of power switches are connected to the first input,
second terminals of second ones of the plurality of power switches are connected to the second input, and
the first, second and third outputs are connected between the second terminals of the first ones of the plurality of power switches and the first terminals of the second ones of the plurality of power switches.

3. The power inverter of claim 1, further comprising a magnetic field sensor arranged adjacent to the second housing of the second conductor.

4. The power inverter of claim 3, wherein the magnetic field sensor is selected from a group consisting of an anisotropic magneto-resistive (AMR) sensor, a giant magneto-resistive (GMR) sensors, a tunnel magneto-resistive (TMR) sensors, and a Hall effect sensor.

5. The power inverter of claim 1, wherein the second housing has rectangular shape and extends in the first plane spaced from the first portion of the first housing.

6. The power inverter of claim 5, wherein:
the third housing includes a first portion, a second portion, and a third portion,
the first portion of the third housing extends in the first plane,
the second portion of the third housing extends from the first portion in a direction transverse to the first plane, and
the third portion extends from the second portion in a second plane that is transverse to the first plane.

7. The power inverter of claim 1, wherein each of the plurality of twisted and segmented wires comprise:
a first insulating sleeve; and
a plurality of multi-wire conductors arranged in the first insulating sleeve,
wherein the plurality of multi-wire conductors are wound around each other, and
wherein each of the multi-wire conductors includes multiple wires that are wound around each other inside a second insulating sleeve.

8. A power inverter comprising:
first and second inputs;
a plurality of power switches in communication with the first and second inputs;
first, second and third outputs in communication with the plurality of power switches; and
first, second and third conductors configured to connect the first, second and third outputs to an electric machine,
wherein:
each of the first, second and third conductors comprise a plurality of twisted and segmented wires,
each of the plurality of twisted and segmented wires comprise a first insulating sleeve and a plurality of multi-wire conductors arranged in the first insulating sleeve,
the plurality of multi-wire conductors are wound around each other,
each of the multi-wire conductors includes multiple wires that are wound around each other inside a second insulating sleeve,
the first, second and third conductors include first, second and third housings enclosing the plurality of twisted and segmented wires,
at least two of the first, second and third housings extend in at least three planes, and
the first housing includes a first portion, a second portion and a third portion, the first portion extends in a first plane, the second portion extends from the first portion in a direction transverse to the first plane, and the third portion extends from the second portion in a second plane that is parallel to the first plane.

9. The power inverter of claim 8, wherein:
the plurality of power switches each include first terminals, second terminals and control terminals,
the first terminals of first ones of the plurality of power switches are connected to the first input,
second terminals of second ones of the plurality of power switches are connected to the second input, and
the first, second and third outputs are connected between the second terminals of the first ones of the plurality of power switches and the first terminals of the second ones of the plurality of power switches.

10. The power inverter of claim 8, further comprising a magnetic field sensor arranged adjacent to the second housing of the second conductor.

11. The power inverter of claim 10, wherein the magnetic field sensor is selected from a group consisting of an anisotropic magneto-resistive (AMR) sensor, a giant magneto-resistive (GMR) sensors, a tunnel magneto-resistive (TMR) sensors, and a Hall effect sensor.

12. The power inverter of claim 11, wherein the second housing has rectangular shape and extends in the first plane spaced from the first portion of the first housing.

13. The power inverter of claim 12, wherein:
the third housing includes a first portion, a second portion, and a third portion,
the first portion of the third housing extends in the first plane,
the second portion of the third housing extends from the first portion in a direction transverse to the first plane, and
the third portion extends from the second portion in a second plane that is transverse to the first plane.

14. A power inverter comprising:
first and second inputs;
a plurality of power switches in communication with the first and second inputs;
first, second and third outputs in communication with the plurality of power switches; and
first, second and third conductors configured to connect the first, second and third outputs to an electric machine,
wherein:
each of the first, second and third conductors comprise a plurality of twisted and segmented wires, each of the plurality of twisted and segmented wires comprise an insulating sleeve and a plurality of multi-wire conductors arranged in the first insulating sleeve, the first, second and third conductors include first, second and third housings enclosing the plurality of twisted and segmented wires, wherein at least two of the first, second and third housings extend in at least three planes, and the first housing includes a first portion, a second portion and a third portion, the first portion extends in a first plane, the second portion extends from the first portion in a direction transverse to the first plane, and the third portion extends from the second portion in a second plane that is parallel to the first plane.

15. The power inverter of claim 14, wherein:

the plurality of power switches each include first terminals, second terminals and control terminals, the first terminals of first ones of the plurality of power switches are connected to the first input, second terminals of second ones of the plurality of power switches are connected to the second input, and the first, second and third outputs are connected between the second terminals of the first ones of the plurality of power switches and the first terminals of the second ones of the plurality of power switches.

16. The power inverter of claim 15, further comprising a magnetic field sensor arranged adjacent to the second housing of the second conductor.

17. The power inverter of claim 16, wherein the magnetic field sensor is selected from a group consisting of an anisotropic magneto-resistive (AMR) sensor, a giant magneto-resistive (GMR) sensors, a tunnel magneto-resistive (TMR) sensors, and a Hall effect sensor.

18. The power inverter of claim 17, wherein:

the insulating sleeve is a first insulating sleeve;

the plurality of multi-wire conductors are wound around each other; and each of the multi-wire conductors includes multiple wires that are wound around each other inside a second insulating sleeve.

19. The power inverter of claim 14, wherein the second housing has rectangular shape and extends in the first plane spaced from the first portion of the first housing.

20. The power inverter of claim 14, wherein:

the third housing includes a first portion, a second portion, and a third portion, the first portion of the third housing extends in the first plane, the second portion of the third housing extends from the first portion in a direction transverse to the first plane, and the third portion extends from the second portion in a second plane that is transverse to the first plane.

* * * * *